United States Patent
Inoko

(10) Patent No.: US 9,041,848 B2
(45) Date of Patent: May 26, 2015

(54) IMAGING OPTICAL SYSTEM, AND PROJECTION-TYPE IMAGE DISPLAY APPARATUS AND IMAGE PICKUP APPARATUS USING THE SAME

(71) Applicant: CANON KABUSHIKI KAISHA, Tokyo (JP)

(72) Inventor: Kazuhiro Inoko, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/951,707

(22) Filed: Jul. 26, 2013

(65) Prior Publication Data

US 2014/0036142 A1 Feb. 6, 2014

(30) Foreign Application Priority Data

Jul. 31, 2012 (JP) .................................. 2012-169755

(51) Int. Cl.
| | |
|---|---|
| G02B 13/16 | (2006.01) |
| H04N 5/225 | (2006.01) |
| G02B 15/14 | (2006.01) |
| G02B 3/00 | (2006.01) |
| G02B 13/06 | (2006.01) |
| G02B 13/22 | (2006.01) |
| G09G 5/10 | (2006.01) |

(52) U.S. Cl.
CPC ............ *G02B 3/00* (2013.01); *G02B 13/06* (2013.01); *G02B 13/22* (2013.01); *G09G 5/10* (2013.01)

(58) Field of Classification Search
None
See application file for complete search history.

(56) References Cited

U.S. PATENT DOCUMENTS

| | | | | |
|---|---|---|---|---|
| 5,835,252 | A | 11/1998 | Meier et al. | |
| 7,280,285 | B2* | 10/2007 | Nagahara et al. | 359/680 |
| 7,545,578 | B2* | 6/2009 | Sugita | 359/680 |
| 7,586,690 | B2* | 9/2009 | Yamada | 359/680 |
| 7,605,985 | B2* | 10/2009 | Nagahara et al. | 359/680 |
| 7,710,659 | B2* | 5/2010 | Nagatoshi | 359/682 |
| 7,855,840 | B2* | 12/2010 | Minefuji | 359/682 |
| 7,995,283 | B2* | 8/2011 | Wada | 359/682 |
| 8,072,690 | B2* | 12/2011 | Nagatoshi | 359/682 |
| 8,213,091 | B2* | 7/2012 | Sado | 359/682 |
| 8,270,091 | B2* | 9/2012 | Yamamoto | 359/680 |
| 2001/0004301 | A1 | 6/2001 | Kodama et al. | |
| 2005/0088762 | A1 | 4/2005 | Ohashi | |
| 2005/0117123 | A1 | 6/2005 | Yatsu et al. | |

(Continued)

FOREIGN PATENT DOCUMENTS

| | | |
|---|---|---|
| CN | 1220010 A | 6/1999 |
| JP | H04-356008 A | 12/1992 |
| JP | 2001-23887 A | 1/2001 |

(Continued)

*Primary Examiner* — Justin P Misleh
(74) *Attorney, Agent, or Firm* — Canon USA Inc IP Division

(57) ABSTRACT

An imaging optical system includes a first optical unit having positive refractive power making an image at an image plane at an enlargement-side of the imaging optical system and an intermediate image at an intermediate image position in the imaging optical system conjugate to each other, and a second optical unit having positive refractive power making the intermediate image and an image at an image plane at a reduction-side of the imaging optical system conjugate to each other, wherein, when a focal length of the first optical unit is denoted by fF and a focal length of the second optical unit is denoted by fR, the following condition is satisfied:

$0 < fF/fR < 0.8$, and wherein the second optical unit includes a negative lens disposed on the optical axis closest to the enlargement side.

20 Claims, 12 Drawing Sheets

(56) References Cited

FOREIGN PATENT DOCUMENTS

| | | | |
|---|---|---|---|
| JP | 2002-014283 A | 1/2002 |
| JP | 2004-252101 A | 9/2004 |
| JP | 2008-151949 A | 7/2008 |

\* cited by examiner

IMAGING OPTICAL SYSTEM, AND PROJECTION-TYPE IMAGE DISPLAY APPARATUS AND IMAGE PICKUP APPARATUS USING THE SAME

BACKGROUND OF THE INVENTION

1. Field of the Invention

The present invention relates to an imaging optical system such as an imaging lens or a projector projection lens, and more particularly, to an imaging lens which is appropriate for a wide-angle lens having a wide angle of view.

2. Description of the Related Art

In the related art, when a wide landscape is to be photographed by a camera, or when a wide screen is to be projected within a short distance by a projector, a wide-angle lens having a wide angle of view is used. A wide-angle lens can be used for an apparatus where a distance between a reduction-side imaging plane and a lens end closest to the reduction-side imaging plane is long. For example, a single-lens reflex camera or a projector having a color combining system. For such applications, a wide-angle lens will typically use a retrofocus-type lens unit. The retrofocus-type lens unit is a lens unit with a lens having a strong negative refractive power disposed nearer to an enlargement-side imaging plane than a stop. Hereinafter, the reduction-side imaging plane side is referred to as the reduction-side; and the enlargement-side imaging plane side is referred to the enlargement-side.

However, as the retrofocus-type lens unit has a wider angle of view, the diameter of the enlargement-side lens is greatly increased. Techniques for solving the problem are discussed in the English Abstract of Japanese Patent Application Laid-Open No. 04-356008 and U.S. Patent Application Publication No. 2005/0117123.

The English Abstract of Japanese Patent Application Laid-Open No. 04-356008 discusses an optical system which forms an intermediate image of an object within a lens unit and re-forms the intermediate image on an image plane. Hereinafter, in order to avoid confusion in the specification, with respect to an in-lens conjugate point where the intermediate image is formed within a lens unit as a division point, the enlargement-side lens unit is referred to as a first lens unit, and the reduction-side lens unit is referred to as a second lens unit.

The first lens unit in the lens unit discussed in the English Abstract of Japanese Patent Application Laid-Open No. 04-356008 forms a reduced image of the object as an intermediate image by a reduction optical system. The second lens unit is configured as a relay system which forms the intermediate image on the image plane (an imaging plane of an image sensor). Accordingly, a back focus of the first lens unit is shortened, so that the diameter of the enlargement-side lens of the first lens unit is reduced.

The lens unit discussed in U.S. Patent Application Publication No. 2005/0117123 is a projection lens for a projector, which forms an image obtained by a light modulation element as an intermediate image and enlarges the intermediate image to project the enlarged image onto a projection receiving surface. Therefore, similarly to the English Abstract of Japanese Patent Application Laid-Open No. 04-356008, the diameter of the enlargement-side lens of the first lens unit is also reduced.

The English Abstract of Japanese Patent Application Laid-Open No. 2001-23887 discusses a projection optical system of an exposure apparatus, which forms an intermediate image, although the projection optical system is not a wide-angle lens.

However, the lens unit discussed in the English Abstract of Japanese Patent Application Laid-Open No. 04-356008 is a fisheye lens, and large distortion remains on a final image plane. Therefore, the lens unit is not appropriate for a wide-angle lens for general picture photographing or a projection lens for a projector, where distortion needs to be sufficiently corrected.

On the other hand, in the lens unit discussed in U.S. Patent Application Publication No. 2005/0117123), although distortion is corrected, aberration correction is independently performed in the first and second lens units disposed with respect to the in-lens conjugate point as a division point. Therefore, although the diameter of the enlargement-side lens is reduced, the total lens length is increased. In other words, both of the English Abstract of Japanese Patent Application Laid-Open No. 04-356008 and U.S. Patent Application Publication No. 2005/0117123 do not simultaneously accomplish the correction of distortion and the miniaturization in the optical axis direction.

SUMMARY OF THE INVENTION

The present invention is directed to an imaging optical system which forms an intermediate image, the imaging optical system having a reduced size while sufficiently correcting distortion.

According to an aspect of the present invention, an imaging optical system includes a first optical unit having positive refractive power making an image at an image plane at an enlargement-side of the imaging optical system and an intermediate image at an intermediate image position in the imaging optical system conjugate to each other, and a second optical unit having positive refractive power making the intermediate image and an image at an image plane at a reduction-side of the imaging optical system conjugate to each other, wherein, when a focal length of the first optical unit is denoted by fF and a focal length of the second optical unit is denoted by fR, the following condition is satisfied:

$0 < fF/fR < 0.8$, and wherein the second optical unit includes a negative lens disposed on the optical axis closest to the enlargement side.

According to an embodiment of the present invention, it is possible to provide an imaging optical system which forms an intermediate image, the imaging optical system having a reduced size while sufficiently correcting distortion, and a projection-type image display apparatus and an image pickup apparatus using the imaging optical system.

Further features of the present invention will become apparent from the following description of embodiments with reference to the attached drawings.

BRIEF DESCRIPTION OF THE DRAWINGS

The accompanying drawings, which are incorporated in and constitute a part of the specification, illustrate embodiments, features, and aspects of the invention and, together with the description, serve to explain the principles of the invention.

DESCRIPTION OF THE EMBODIMENTS

Various embodiments, features, and aspects of the invention will be described in detail below with reference to the drawings.

Figure 1:
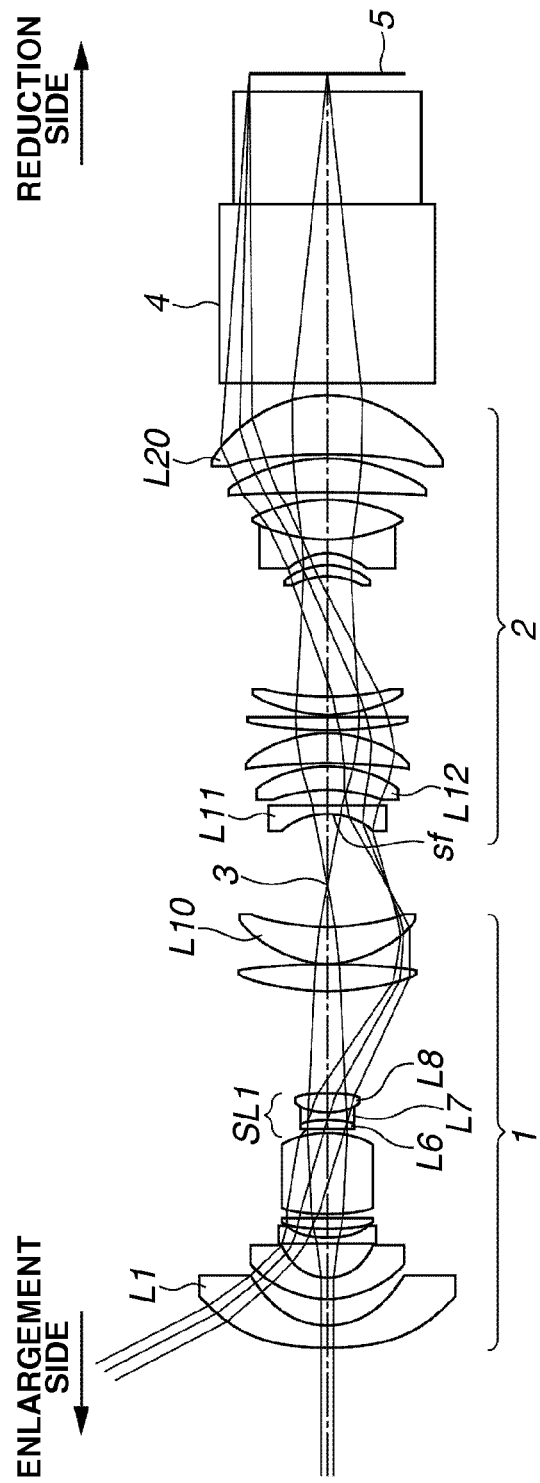
FIG. 1 is a cross-sectional view illustrating an optical system according to a first embodiment of the present invention.

FIG. 1 is a cross-sectional diagram illustrating a configuration including an imaging lens (i.e. an imaging optical system) according to a first embodiment of the present invention. The imaging optical system is a projection optical system, which is designed for a projector (i.e. for a projection-type image display apparatus). The imaging optical system is a wide-angle lens which projects light beams modulated by a liquid crystal panel 5 (a light modulation element) onto a screen (not illustrated) (a projection receiving surface). The left side of FIG. 1 is an enlargement side, and the right side thereof is a reduction side. The wide-angle lens illustrated in FIG. 1 is configured to include a first lens unit 1 (a first optical unit) and a second lens unit 2 (a second optical unit) in order from the enlargement side. The screen surface represents an enlargement-side imaging plane, and the liquid crystal panel 5 is represents a reduction-side imaging plane. Herein, in an enlargement projection apparatus like a projector, an enlargement-side imaging plane is at a position where an image formed by the light modulation element (the liquid crystal panel) is projected. In an image pickup apparatus, the enlargement-side imaging plane is at a position of an object to be imaged. In contrast, in the case of an enlargement projection apparatus, like a projector and so on, the reduction-side imaging plane is the position where the light modulation element (a liquid crystal panel) is provided. In the case of the image pickup apparatus, the reduction-side imaging plane is the position where the image pickup element, like, for example, a CCD, is provided.

The wide-angle lens according to the present embodiment comprises 20 lenses in total. A prism glass 4 having no refractive power is disposed between a lens L20 closest to the reduction side and the liquid crystal panel 5. The prism glass 4 is used for color composition in the projector.

In FIG. 1, the dot-dashed line indicates the optical axis of the wide-angle lens. An in-lens conjugate point 3 (intermediate image point) is located on the optical axis between a tenth lens L10 and an eleventh lens L11. With respect to the in-lens conjugate point 3 as a division point, the first lens L1 through the tenth lens L10 constitute the first lens unit 1, and the eleventh lens L11 through the final lens L20 constitute the second lens unit 2.

The first lens unit 1 is configured to make the screen (an enlargement-side imaging plane) and the in-lens conjugate point 3 conjugate to each other. The second lens unit 2 is configured to make the in-lens conjugate point 3 and the liquid crystal panel 5 (a reduction-side imaging plane) conjugate to each other. If the liquid crystal panel 5 is set as a reference, the first lens unit 1 and the second lens unit 2 are configured to make the liquid crystal panel 5 and the screen conjugate to each other, and thus, the enlargement-side imaging plane can be called an enlargement-side conjugate plane. Conversely, if the screen is set as a reference, the reduction-side imaging plane can be called a reduction-side conjugate plane.

A numerical example of the present embodiment is listed as Numerical Example 1 as follows. A surface number is a number uniquely designated to each lens surface in order from the enlargement side; R is a radius of curvature of each lens surface, d is a surface distance, and nd and vd are a refractive index and an Abbe number, respectively, of a glass material at the d-line (587.56 nm). The lens surface with the symbol "*" attached to the right side of the surface number denotes that the lens surface has an aspherical shape according to the function described below, and coefficients thereof are listed in the numerical example. Herein, a coordinate y is a coordinate in the radial direction when the surface apex of the lens surface is set as a reference and a coordinate x is a coordinate in the optical axis direction when the surface apex of the lens surface is set as a reference. The object distance is infinite.

$$x = (y^2/R)/[1+\{1-(1+K)(y^2/R^2)\}^{1/2}] + Ay^4 + By^6 + Cy^8 + Dy^{10} + Ey^{12} + Fy^{14}$$

In addition, in numerical examples described hereinafter, a focal length of the entire optical system of the wide-angle lens is denoted by an absolute value |f|. Since the conjugate point is formed within a lens unit, the image of the final image plane is an erected image. Therefore, in some cases, the focal length of the entire optical system may have a negative value depending on the definition. However, since the refractive power of the entire optical system is positive, the focal length is represented by an absolute value. This is also applied to the other embodiments.

Numerical Example 1

| |f| = 6.90 ω = 62.2° F/3.0 Image circle size φ26.2 | | | |
|---|---|---|---|---|
| Surface number | R | d | nd | vd |
| OBJ | ∞ | ∞ | | |
| 1* | 63.814 | 3.92 | 1.820 | 42.7 |
| 2* | 13.659 | 4.35 | | |

-continued

| |f| = 6.90 ω = 62.2° F/3.0 Image circle size φ26.2 | | | |
|---|---|---|---|---|
| 3 | 16.654 | 3.61 | 1.772 | 49.5 |
| 4 | 8.111 | 5.77 | | |
| 5 | 1050.049 | 1.00 | 1.805 | 25.4 |
| 6 | 13.303 | 1.48 | | |
| 7 | 31.609 | 1.87 | 1.772 | 49.5 |
| 8 | −295.242 | 0.50 | | |
| 9 | 31.218 | 13.76 | 1.772 | 49.5 |
| 10 | −15.179 | 0.62 | | |
| 11 | 139.551 | 1.49 | 1.696 | 55.5 |
| 12 | −15.540 | 1.24 | 1.805 | 25.4 |
| 13 | 10.662 | 3.23 | 1.563 | 60.6 |
| 14 | −26.383 | 17.09 | | |
| 15 | 38.949 | 4.50 | 1.805 | 25.4 |
| 16 | −107.135 | 0.29 | | |
| 17 | 18.445 | 6.02 | 1.805 | 25.4 |
| 18 | 40.195 | 19.01 | | |
| 19 | −11.729 | 1.50 | 1.834 | 37.1 |
| 20 | −166.339 | 2.55 | | |
| 21 | −26.706 | 3.98 | 1.805 | 25.4 |
| 22 | −20.649 | 0.50 | | |
| 23 | −77.267 | 5.00 | 1.834 | 37.1 |
| 24 | −20.071 | 0.50 | | |
| 25 | 64.062 | 2.16 | 1.834 | 37.1 |
| 26 | 2887.146 | 0.50 | | |
| 27 | 25.054 | 2.97 | 1.805 | 25.4 |
| 28 | 46.969 | 20.16 | | |
| 29 | −13.250 | 2.00 | 1.487 | 70.2 |
| 30 | −10.532 | 1.87 | | |
| 31 | −10.068 | 2.26 | 1.805 | 25.4 |
| 32 | 25.857 | 6.75 | 1.651 | 58.5 |
| 33 | −27.304 | 1.27 | | |
| 34 | −213.988 | 5.78 | 1.487 | 70.2 |
| 35 | −29.328 | 0.50 | | |
| 36* | −625.000 | 10.00 | 1.755 | 51.1 |
| 37* | −22.190 | 2.00 | | |
| 38 | ∞ | 30.00 | 1.516 | 64.1 |
| 39 | ∞ | 19.00 | 1.805 | 25.4 |
| 40 IMG | ∞ | | | |

| Surface number | K | A | B | C | D | E | F |
|---|---|---|---|---|---|---|---|
| 1 | 0 | 6.371e−005 | −2.364e−007 | 5.192e−010 | −3.710e−013 | −3.717e−016 | 9.1204e−019 |
| 2 | 0 | 1.631e−005 | 2.296e−007 | −5.662e−009 | 5.797e−012 | 1.637e−016 | −6.2823e−016 |
| 36 | 0 | −2.317e−005 | −4.911e−009 | 6.517e−011 | −1.291e−013 | −2.623e−016 | 7.3652e−019 |
| 37 | 0 | 1.296e−006 | −1.537e−008 | 8.563e−011 | −1.961e−013 | 2.242e−016 | −1.5633e−019 |

Figure 2:
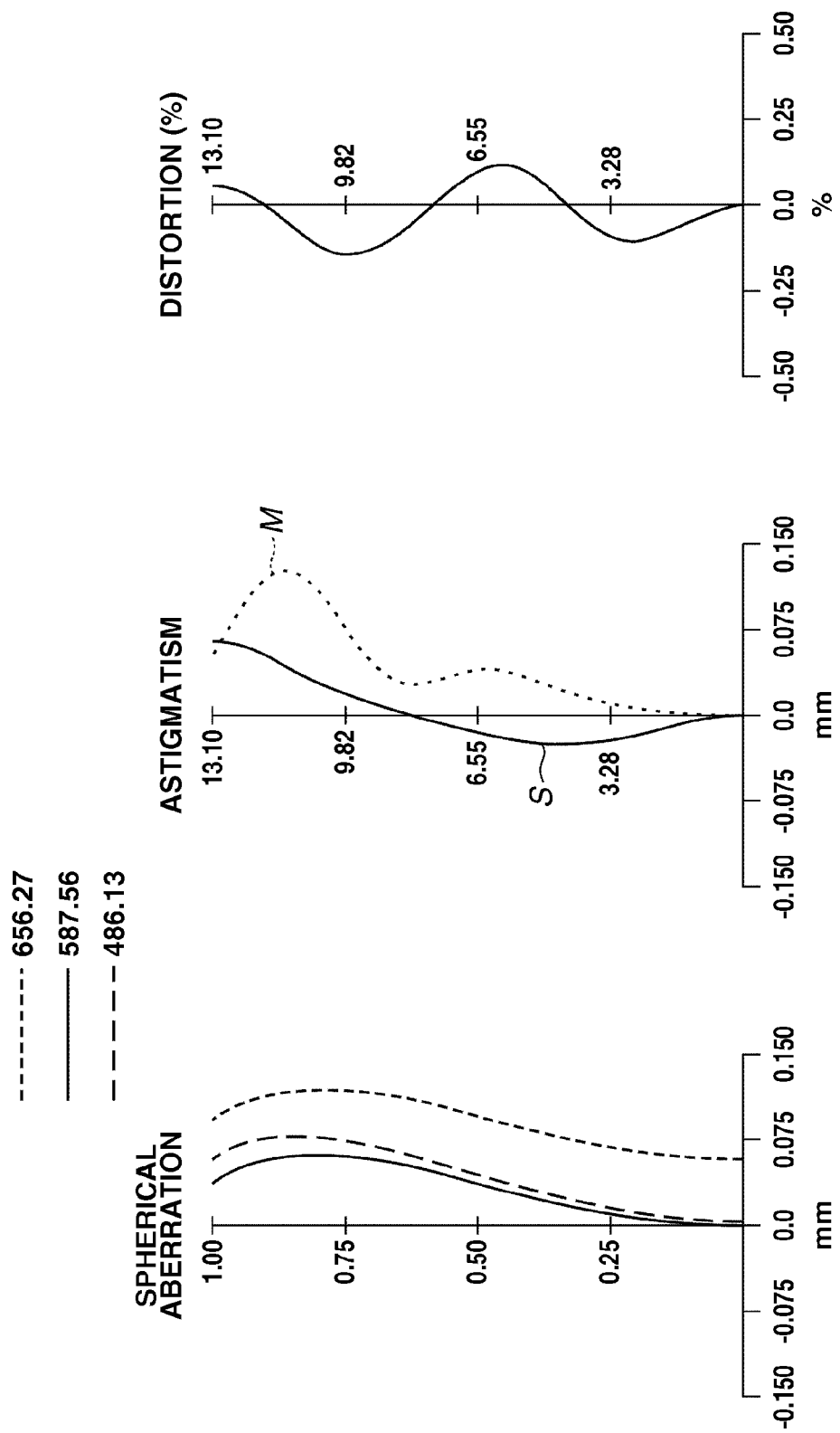
FIG. 2 illustrates longitudinal aberration graphs of the optical system according to the first embodiment of the present invention.

FIG. 2 illustrates longitudinal aberration graphs representing an image forming performance of the wide-angle lens according to the present embodiment. A spherical aberration graph, an astigmatism graph, and a distortion graph are illustrated from the left side of the figure. In the spherical aberration graph, a solid line indicates aberration at the d-line (587.56 nm), a broken line indicates aberration at the F-line (486.13 nm), and a dotted line indicates aberration at the C-line (656.27 nm). The horizontal axis denotes a defocus amount, and the scale thereof is −0.15 to +0.15 [mm]. In the astigmatism graph, a solid line indicates curvature of field of a sagittal image plane, and a dotted line indicates curvature of field of a meridional image plane. The horizontal axis is the same as that of the spherical aberration graph. In the distortion graph, the scale of the horizontal axis is −0.5 to +0.5 [%].

As illustrated in FIG. 2, it can be understood that distortion is corrected well. In addition, spherical aberration and astigmatism are also corrected well.

Figure 3:
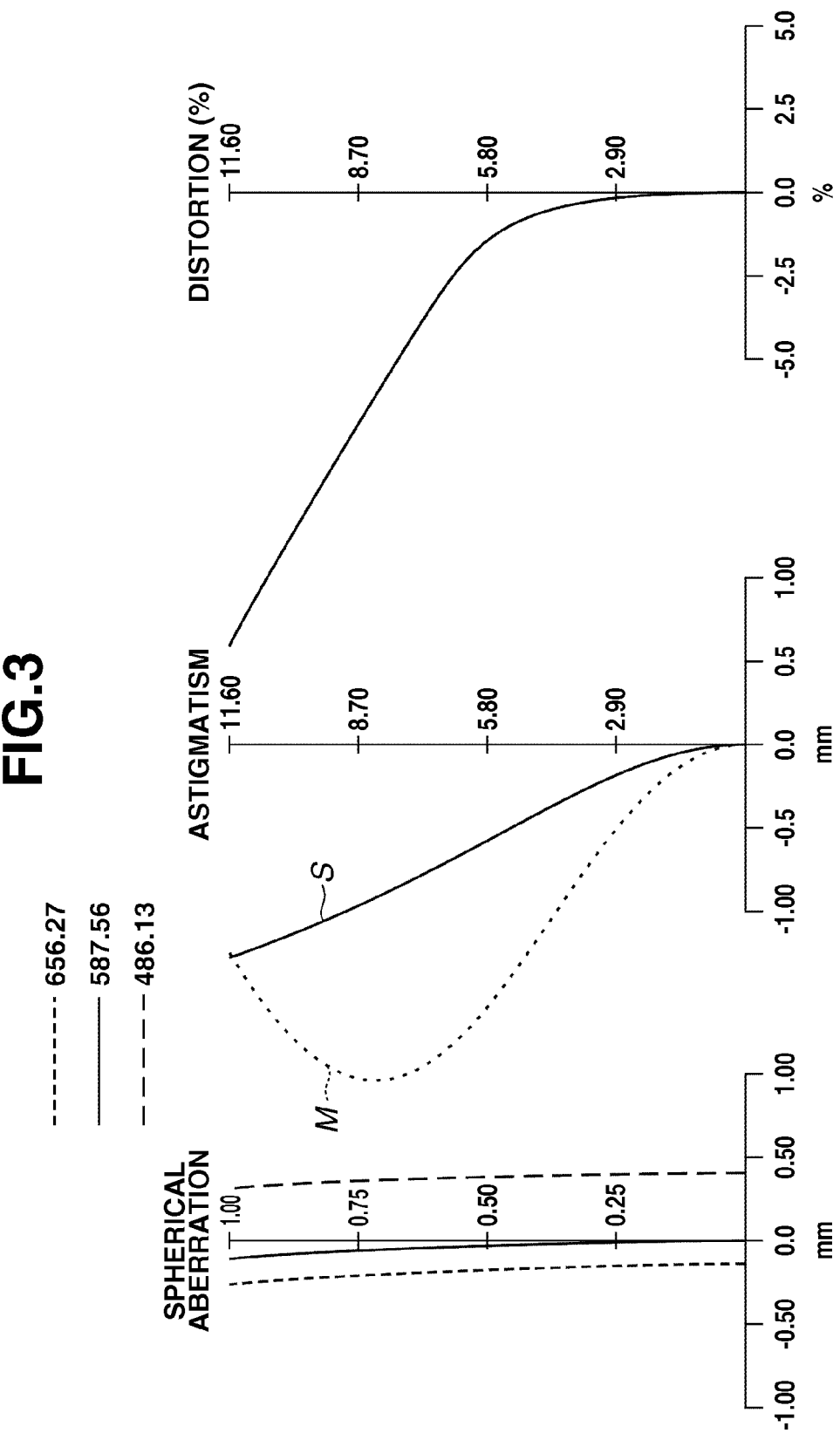
FIG. 3 illustrates longitudinal aberration graphs at conjugate points in the optical system according to the first embodiment of the present invention.

In the wide-angle lens according to the present embodiment, spherical aberration, curvature of field, and distortion still remain at the in-lens conjugate point 3. FIG. 3 illustrates longitudinal aberration graphs at the in-lens conjugate point 3 according to the present embodiment. In FIG. 3, the view point is the same as that of FIG. 2, but the scale is different from that of FIG. 2. The scale of the horizontal axis of spherical aberration and astigmatism is −1.0 to +1.0 [mm]; and the scale of the horizontal axis of distortion is −5.0 to +5.0 [%]. It can be understood from FIG. 3 that large curvature of field and large distortion remain at the in-lens conjugate point 3. On the other hand, it can be understood that over-correction is made with respect to axial chromatic aberration.

The lens closest to the enlargement side of the second lens unit 2, which is a relay lens unit, is configured as a negative lens, and aberration opposite to the remaining aberration is allowed to occur, so that the aberration is cancelled. Therefore, good image forming performance illustrated in FIG. 2 is obtained in the final image plane. In addition, curvature of field and distortion are allowed to remain at the in-lens conjugate point 3, so that a lens for aberration correction of the first lens unit 1 does not need to be installed. Therefore, the wide-angle lens according to the present embodiment can be configured with a small number of lenses. In addition, it is possible to miniaturize the wide-angle lens according to the present embodiment in the optical axis direction.

In addition, in the first lens unit 1, particularly negative distortion is allowed to remain, so that the diameter of the lens for distortion correction does not need to be large. Therefore, the diameter of the enlargement-side lens can be greatly reduced. In addition, the distance between the most-reduction-side lens surface and the liquid crystal panel 5 can be shortened.

As described above, in the wide-angle lens according to the present embodiment, the correction of aberration of the intermediate image formed at the in-lens conjugate point 3 is performed by the second lens unit 2. At this time, as the wide-angle lens has a wider angle of view, negative distortion greatly occurs. Particularly, as the image height is increased, high-order negative distortion occurs as illustrated in FIG. 3. Therefore, the second lens unit 2 needs to generate strong positive distortion.

Accordingly, in the imaging lens according to the present embodiment, although the wide-angle lens has a wider angle of view, or although the image height is high, the above-described effect can be obtained by arranging a surface having strong negative refractive power to be disposed at the first refractive surface sf of the enlargement side of the negative lens at the side (enlargement side) closest to the in-lens conjugate point 3 of the second lens unit 2. The surface having strong negative refractive power has a function of bending (bouncing) the light beam which may be bent toward an inner side of the first lens unit 1 greatly to an outer side thereof and a function of bending the light beam having a particularly high image height greatly to the outer side. Therefore, high-order positive distortion can be generated.

In other words, the wide-angle lens according to the present embodiment is configured to include a first optical unit having positive refractive power which forms an intermediate image and a second optical unit having positive refractive power which forms the intermediate image on the image plane. In addition, since a lens disposed closest to the enlargement side of the second optical unit is a negative lens, it is possible to sufficiently correct distortion and to provide a miniaturized imaging lens.

In addition, when the focal length of the first lens unit 1 is fF and the focal length of the second lens unit 2 is fR, the wide-angle lens according to the present embodiment satisfies the following condition:

$$0.0 < fF/fR < 0.8 \quad (A1)$$

More desirably, instead of the condition (A1), the wide-angle lens may satisfy the following condition:

$$0.0 < fF/fR < 0.5 \quad (A2)$$

Herein, the first refractive surface sf can satisfy any one of the following conditions:

$$-5.00 < f1/fR < -0.05 \quad (1a)$$

$$-20.0 < f1/|f| < 0.0 \quad (2a)$$

$$-12.0 < f1/fF < 0.0 \quad (3a)$$

$$-3.0 < r/|f| < -0.1 \quad (4a)$$

$$-1.5 < r/\{fR1 \cdot (n-1)\} < -0.5 \quad (5a)$$

The condition (1a) is the ratio of the focal length f1 of the negative lens L11 disposed closest to the enlargement side of the second lens unit 2 to the focal length fR of the second lens unit 2.

The condition (2a) is the ratio of the focal length f1 to the focal length |f| of the entire optical system of the wide-angle lens (the entire optical system including the first lens unit 1 and the second lens unit 2).

The condition (3a) is the ratio of the focal length f1 to the focal length fF of the first lens unit 1.

The condition (4a) is the ratio of the radius of curvature r of the first refractive surface sf of the enlargement side of the negative lens L11 disposed closest to the enlargement side of the second lens unit 2 to the focal length |f| of the entire optical system of the wide-angle lens.

The condition (5a) is the ratio of a refractive power r/(n−1) of the first refractive surface sf of the second lens unit 2 to the focal length fR1 of a first group of the second lens unit 2. n is a refractive index of the negative lens L11. Herein, the first group of the second lens unit 2 denotes a lens or a lens group disposed at the enlargement side with respect to the largest lens surface distance in the second lens unit 2.

In the numerical ranges of the conditions (1a) to (5a), if the numeric value is smaller than the lower limit value or if the numeric value is larger than the upper limit value, distortion including high order distortion cannot be appropriately corrected.

Instead of the conditions (1a) to (5a), any one of the following conditions can be satisfied:

$$-3.00 < f1/fR < -0.10 \quad (1b)$$

$$-10.0 < f1/|f| < -1.0 \quad (2b)$$

$$-9.0 < f1/fF < -2.0 \quad (3b)$$

$$-2.0 < r/|f| < -0.5 \quad (4b)$$

$$-1.4 < r/\{fR1 \cdot (n-1)\} < -0.6 \quad (5b)$$

The numeric values in the various embodiments are listed in Table 1.

More desirably, off-axis principal rays incident on the first refractive surface sf may be set to converge at the reduction side. In other words, a converging light flux may be incident on the negative lens L11. Accordingly, it is possible to allow high-order positive distortion to more effectively occur, and it is possible to suppress an increase in diameter of the enlargement side lens of the second lens unit 2.

In addition, a positive lens L12 is disposed at the reduction side of the negative lens L11 having the first refractive surface sf without another negative lens interposed therebetween, and the positive lens L12 may be a meniscus lens having a shape convex toward the reduction side. Accordingly, while distortion occurring at the first refractive surface sf remains, the diverged rays can be returned to the direction where the rays are to converge.

More desirably, in the imaging lens having a particularly large degree of wide angle (first, second, and fourth embodiments), when the focal length of the negative lens L11 having the refractive surface sf is denoted by f1 and the focal length of the positive lens L12 is denoted by f2, the following condition (6a) may be satisfied:

$$-1.00 < f1/f2 < -0.05 \quad (6a)$$

More desirably, instead of the condition (6a), the following condition (6b) may be satisfied:

$$-0.80 < f1/f2 < -0.10 \quad (6b)$$

In the conditions (6a) and (6b), if the numeric value is smaller than the lower limit value, the focal length of the positive lens L12 is too greatly increased in comparison to the focal length of the negative lens L11 (the refractive power of the positive lens becomes weak in comparison to the negative lens), so that the effect of allowing the rays of the positive lens L12 to converge cannot be obtained. On the other hand, in the conditions (6a) and (6b), if the numeric value is larger than the upper limit value, the effect of distortion intentionally occurring at the negative lens L11 cannot be obtained.

The numeric values in the various embodiments are listed in Table 1.

More desirably, since the aberration correction effect can be more effectively obtained, the distance between the reduction-side surface of the negative lens L11 having the refractive surface sf and the enlargement side surface of the positive lens L12 may be an air distance. In other words, the negative lens L11 and the positive lens L12 can be adjacent to each other.

More desirably, the second lens unit 2 can have a magnification close to the unit magnification if possible. The reason is as follows. If the second lens unit has the unit magnification, the paths of off-axis principal rays become symmetric at the enlargement side and the reduction side of an edge portion of a stop or a lens substantially functioning as a stop, so that off-axis aberration such as coma or curvature of field can be easily corrected.

In addition, in the present embodiment, a cemented lens SL1 obtained by cementing three lens L6, L7, and L8 is disposed in the first lens unit 1. In a lens unit where imaging is performed twice, axial chromatic aberration greatly occurs in comparison to the lens unit where imaging is performed once. In order to solve this problem, as described above, a three-lens element cemented lens obtained by cementing positive, negative, and positive lenses in this order from the enlargement side is used. This configuration is very effective for reducing axial chromatic aberration.

As the present embodiment, when a three-lens cemented lens is used in the first lens unit, the negative lens L7 may be configured by using a high dispersion glass, and the positive lenses L6 and L8 may be configured by using a low dispersion glass. In the cemented lens SL1, the glass material of the negative lens L7 has lower Abbe number (higher dispersion) than the glass material of the positive lenses L6 and L8. Accordingly, axial chromatic aberration is effectively reduced.

Figure 4:
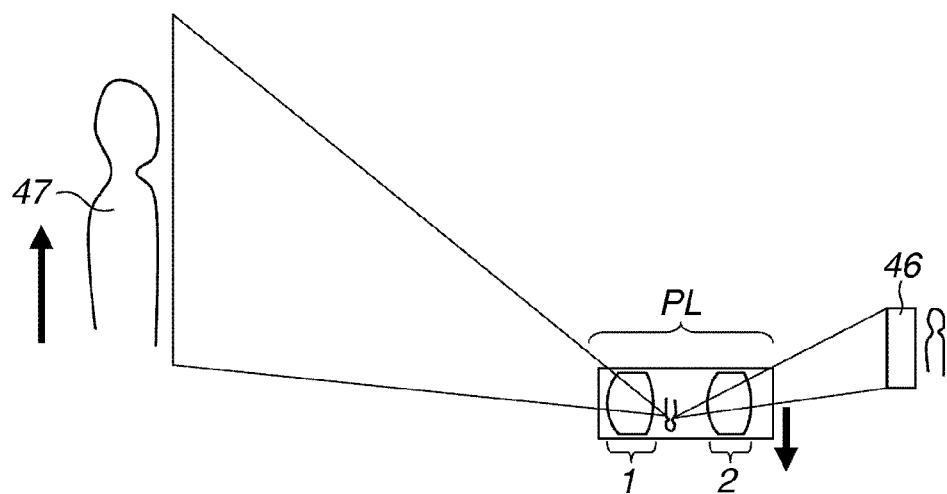
FIG. 4 is a cross-sectional view illustrating a case where the optical system according to the first embodiment of the present invention is used for a projection-type image display apparatus.

FIG. 4 is a diagram illustrating shifting (moving) of a projection image 47 projected on a screen when the wide-angle lens according to the present embodiment is used as a projection lens PL of a projection-type image display apparatus. The projection-type image display apparatus is configured to include a driving unit (not illustrated) which moves the projection lens PL in a direction having a component perpendicular to the optical axis of the projection lens to shift the projection position of the projection image 47 projected on the screen. In order to shift the projection image 47 projected on the screen, the first lens unit 1 or the second lens unit 2 is not individually moved, but the entire optical system of the lens units is shifted. In addition, the moving direction of the projection lens PL is opposite to the moving direction of the projection image. Accordingly, the projection image can be appropriately shifted. In other words, the shifting direction of the liquid crystal panel 46 (a light modulation element) is the same as the shifting direction of the projection image 47.

Figure 5:
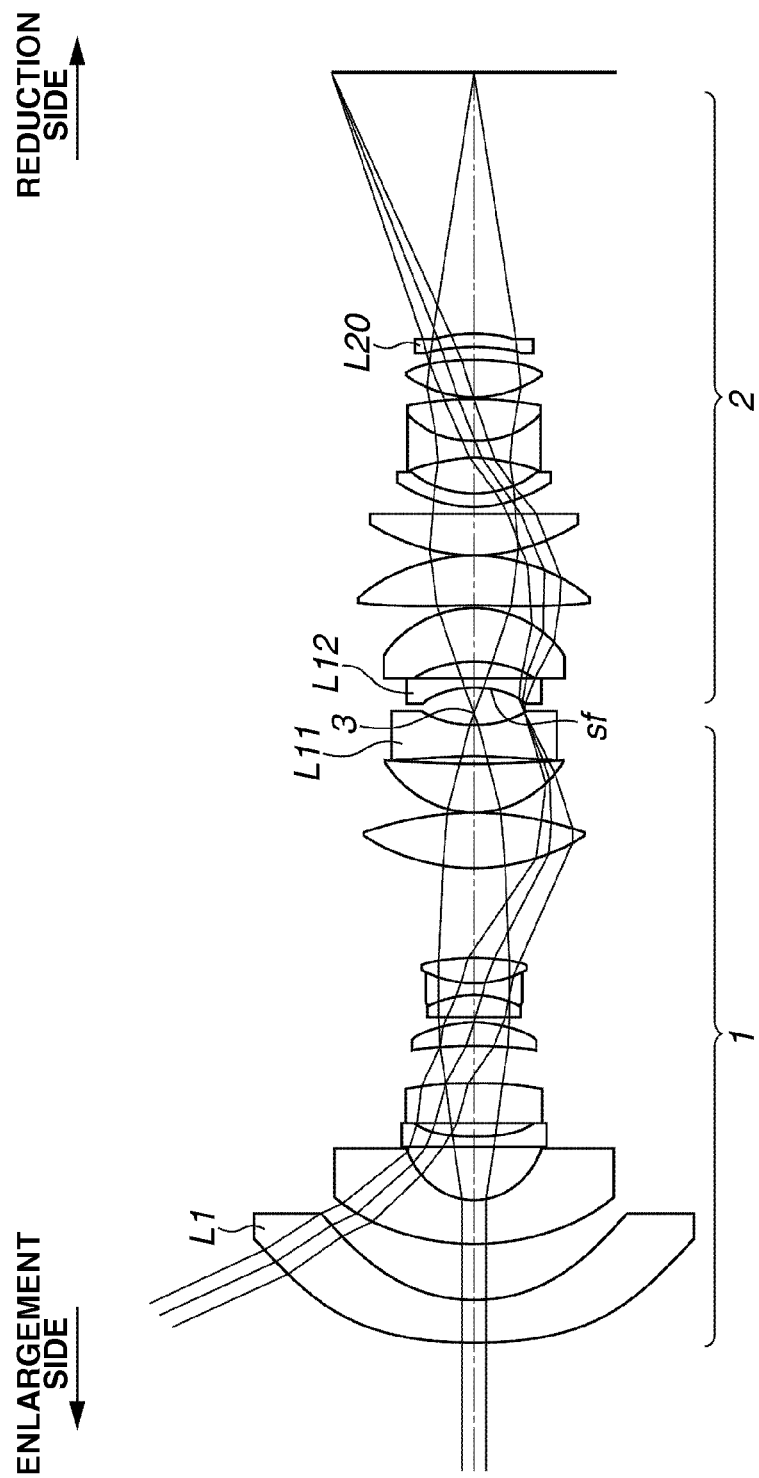
FIG. 5 is a cross-sectional view illustrating an optical system according to a second embodiment of the present invention.

FIG. 5 is a cross-sectional diagram illustrating a configuration of a wide-angle lens according to a second embodiment of the present invention. The wide-angle lens is designed by considering the use as an imaging lens (imaging optical system) of an image pickup apparatus such as a single-lens reflex camera. The first lens unit 1 is configured to include a first lens L1 through an eleventh lens L11. The second lens unit 2 is configured to include a twelfth lens L12 through a final lens L20. In the second embodiment, the lens corresponding to the negative lens L11 according to the first embodiment is a lens L12.

The left side of FIG. 5 is the enlargement side, and the right side thereof is the reduction side. The wide-angle lens illustrated in FIG. 5 is configured to include a first lens unit 1 (first optical unit) and a second lens unit 2 (second optical unit) in this order from the enlargement side. The object plane is an enlargement-side imaging plane; and the image plane is a reduction-side imaging plane.

The image pickup apparatus include an image sensor. In the image pickup apparatus, an image plane is an imaging plane of the image sensor, which receives light from a subject (object) through the wide-angle lens and photo-electrically converts the received light to form image data.

The first lens unit 1 is configured to make the object plane and an in-lens conjugate point 3 conjugate to each other. The second lens unit 2 is configured to make the in-lens conjugate point 3 and the image sensor conjugate to each other.

In addition, unlike the first embodiment, the back focus region of the image pickup apparatus is a movable region of a flip-up mirror (quick-return mirror) and a prism glass is not disposed there. A numerical example of the present embodiment is listed as Numerical Example 2. The object distance is infinite.

The imaging lens according to the second embodiment is also configured to satisfy the condition (A1) described in the first embodiment, and the lens disposed closest to the enlargement side of the second lens unit is configured as a negative lens. Therefore, it is possible to sufficiently correct distortion and to provide a miniaturized imaging lens.

In addition, the imaging lens according to the second embodiment is also configured to satisfy the desirable conditions described in the first embodiment, and thus, similar effects obtained in the conditions of the first embodiment can be also obtained.

Numerical Example 2

| |f| = 10 ω = 65.2° F/3.0 Image circle size φ43.28 | | | |
|---|---|---|---|---|
| | R | d | nd | vd |
| OBJ | ∞ | ∞ | | |
| 1* | 82.062 | 6.54 | 1.820 | 42.7 |
| 2* | 25.431 | 8.37 | | |
| 3 | 34.122 | 6.50 | 1.834 | 42.7 |
| 4 | 9.881 | 7.99 | | |
| 5 | −281.802 | 1.65 | 1.583 | 59.3 |
| 6 | 21.303 | 1.72 | | |
| 7 | 141.145 | 6.25 | 1.805 | 25.4 |
| 8 | −51.360 | 5.59 | | |
| 9 | −53.433 | 3.62 | 1.696 | 55.5 |
| 10 | −15.998 | 0.50 | | |
| 11 | 62.078 | 3.46 | 1.677 | 55.3 |

-continued

| |f| = 10 ω = 65.2° F/3.0 Image circle size φ43.28 | | | | |
|---|---|---|---|---|
| 12 | −13.466 | 1.65 | 1.805 | 25.4 |
| 13 | 15.441 | 3.88 | 1.563 | 60.6 |
| 14 | −29.361 | 13.34 | | |
| 15 | 29.411 | 8.28 | 1.696 | 55.5 |
| 16 | −47.572 | 0.20 | | |
| 17 | 15.310 | 7.16 | 1.808 | 22.7 |
| 18 | 117.677 | 1.14 | | |
| 19 | −96.471 | 4.69 | 1.805 | 25.4 |
| 20 | 16.052 | 5.54 | | |
| 21 | −13.428 | 1.50 | 1.737 | 32.2 |
| 23 | −16.967 | 8.05 | 1.805 | 25.4 |
| 24 | −15.696 | 0.20 | | |
| 25 | 287.024 | 7.51 | 1.834 | 42.7 |
| 26 | −27.300 | 0.20 | | |
| 27 | 27.696 | 6.14 | 1.834 | 37.1 |
| 28 | 355.764 | 1.00 | | |
| 29 | 18.817 | 2.00 | 1.698 | 30.1 |
| 30 | 13.870 | 5.36 | | |
| 31 | −20.188 | 2.48 | 1.720 | 34.7 |
| 32 | 13.455 | 6.35 | 1.496 | 81.5 |
| 33 | −49.220 | 0.20 | | |
| 34 | 16.251 | 5.67 | 1.496 | 81.5 |
| 35 | −27.774 | 1.96 | | |
| 36* | −20.455 | 1.89 | 1.497 | 81.5 |
| 37* | −18.954 | | | |
| IMG | | | | |

| Surface number | K | A | B | C | D | E | F |
|---|---|---|---|---|---|---|---|
| 1 | 0 | 2.082e−005 | −2.462e−008 | 2.015e−011 | −7.073e−015 | −3.932e−018 | 2.9057e−021 |
| 2 | 0 | 2.018e−005 | 3.638e−008 | −2.757e−010 | 3.566e−014 | 7.412e−016 | −7.2652e−019 |
| 36 | 0 | 7.359e−005 | 1.620e−006 | −3.839e−009 | −6.492e−011 | 1.915e−013 | 0 |
| 37 | 0 | 1.433e−004 | 1.592e−006 | 1.125e−009 | −6.884e−011 | 5.055e−013 | 0 |

Figure 6:
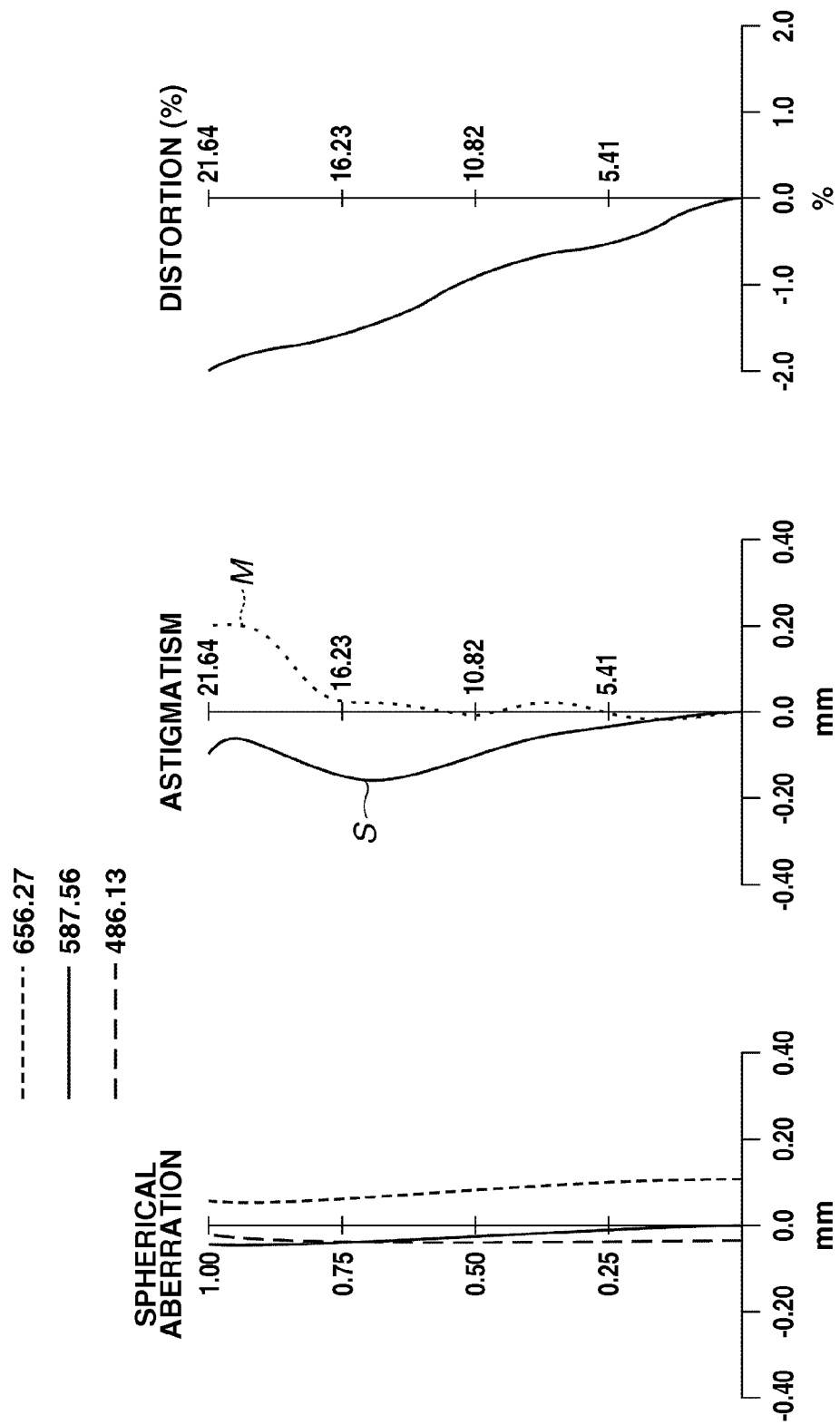
FIG. 6 illustrates longitudinal aberration graphs of the optical system according to the second embodiment of the present invention.

FIG. 6 illustrates longitudinal aberration graphs representing image forming performance according to the present embodiment. Similarly to the first embodiment, a particularly wide angle and high performance can be obtained.

Figure 7:
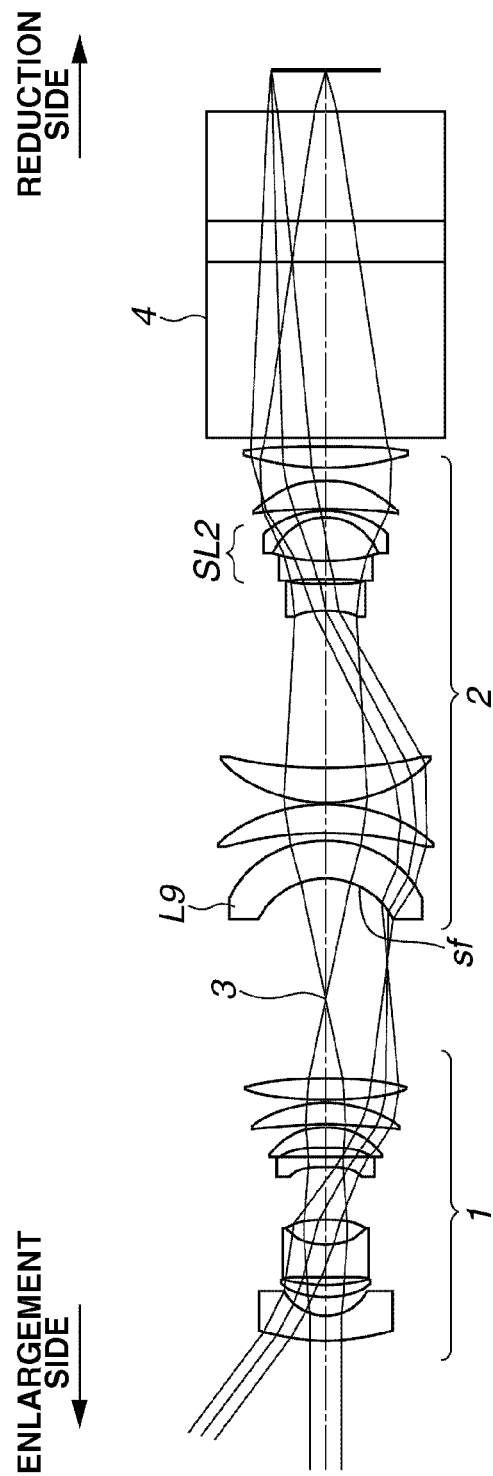
FIG. 7 is a cross-sectional view illustrating an optical system according to a third embodiment of the present invention.

FIG. 7 is a cross-sectional diagram illustrating a configuration of a wide-angle lens according to a third embodiment of the present invention. In the configuration of the present embodiment, the back focus is increased by allowing the angle of view to be slightly suppressed and allowing the F-number to be smaller. A numerical example of the present embodiment is listed as Numerical Example 3. The object distance is infinite.

In the third embodiment, the lens corresponding to the negative lens L11 according to the first embodiment is a lens L9.

The wide-angle lens according to the third embodiment is also configured to satisfy the condition (A1) described in the first embodiment, and the lens disposed closest to the enlargement side of the second lens unit is configured as a negative lens. Therefore, it is possible to sufficiently correct distortion and to provide a miniaturized imaging lens.

In addition, the wide-angle lens according to the third embodiment is also configured to satisfy the desired conditions described in the first embodiment, and thus, similar effects obtained in the conditions of the first embodiment can be also obtained Numerical Example 3

| |f| = 12.4 ω = 37.2° F/2.0 Image circle size φ18.8 | | | | |
|---|---|---|---|---|
| | R | d | nd | νd |
| OBJ | ∞ | ∞ | | |
| 1* | 23.948 | 4.85 | 1.693 | 53.2 |
| 2* | 7.010 | 3.30 | | |
| 3 | 13.156 | 2.21 | 1.805 | 25.4 |
| 4 | 24.194 | 1.38 | | |
| 5 | −227.645 | 6.00 | 1.688 | 31.0 |
| 6 | 10.261 | 4.33 | 1.788 | 47.3 |
| 7 | −18.411 | 9.56 | | |
| 8 | −11.847 | 1.48 | 1.805 | 25.4 |
| 9 | 708.273 | 1.90 | | |
| 10 | −22.312 | 3.73 | 1.772 | 49.5 |
| 11 | −12.013 | 0.50 | | |
| 12 | −81.905 | 3.83 | 1.772 | 49.5 |
| 13 | −22.103 | 0.50 | | |
| 14 | 55.880 | 3.97 | 1.696 | 55.5 |
| 15 | −69.760 | 35.78 | | |

-continued

| |f| = 12.4 ω = 37.2° F/2.0 Image circle size φ18.8 | | | |
|---|---|---|---|---|
| 16 | −13.289 | 7.00 | 1.772 | 49.5 |
| 17 | −19.179 | 1.23 | | |
| 18 | −67.392 | 5.14 | 1.696 | 55.5 |
| 19 | −29.305 | 0.50 | | |
| 20 | 26.402 | 6.13 | 1.834 | 42.7 |
| 21 | 78.428 | 28.29 | | |
| 22 | −12.813 | 4.78 | 1.805 | 25.4 |
| 23 | 107.016 | 0.85 | | |
| 24 | −53.535 | 3.24 | 1.805 | 25.4 |
| 25 | 29.655 | 7.80 | 1.487 | 70.2 |
| 26 | −9.547 | 1.10 | 1.755 | 27.5 |
| 27 | −17.122 | 0.50 | | |
| 28 | −80.069 | 4.88 | 1.595 | 67.7 |
| 29 | −17.861 | 2.49 | | |
| 30 | 46.209 | 3.72 | 1.808 | 22.7 |
| 31 | −148.016 | 1.50 | | |
| 32 | ∞ | 31.74 | 1.516 | 64.1 |
| 33 | ∞ | 7.50 | 1.516 | 64.1 |
| 34 | ∞ | 19.50 | 1.805 | 25.4 |
| 35 | ∞ | | | |
| IMG | | | | |

| Surface number | K | A | B | C | D | E |
|---|---|---|---|---|---|---|
| 1 | −5.609e+000 | 3.441e−005 | −3.798e−007 | 9.898e−010 | −6.188e−012 | 1.010e−014 |
| 2 | −4.544e−001 | 8.402e−005 | −1.196e−007 | −1.241e−008 | 4.265e−010 | −9.531e−012 |

Figure 8:
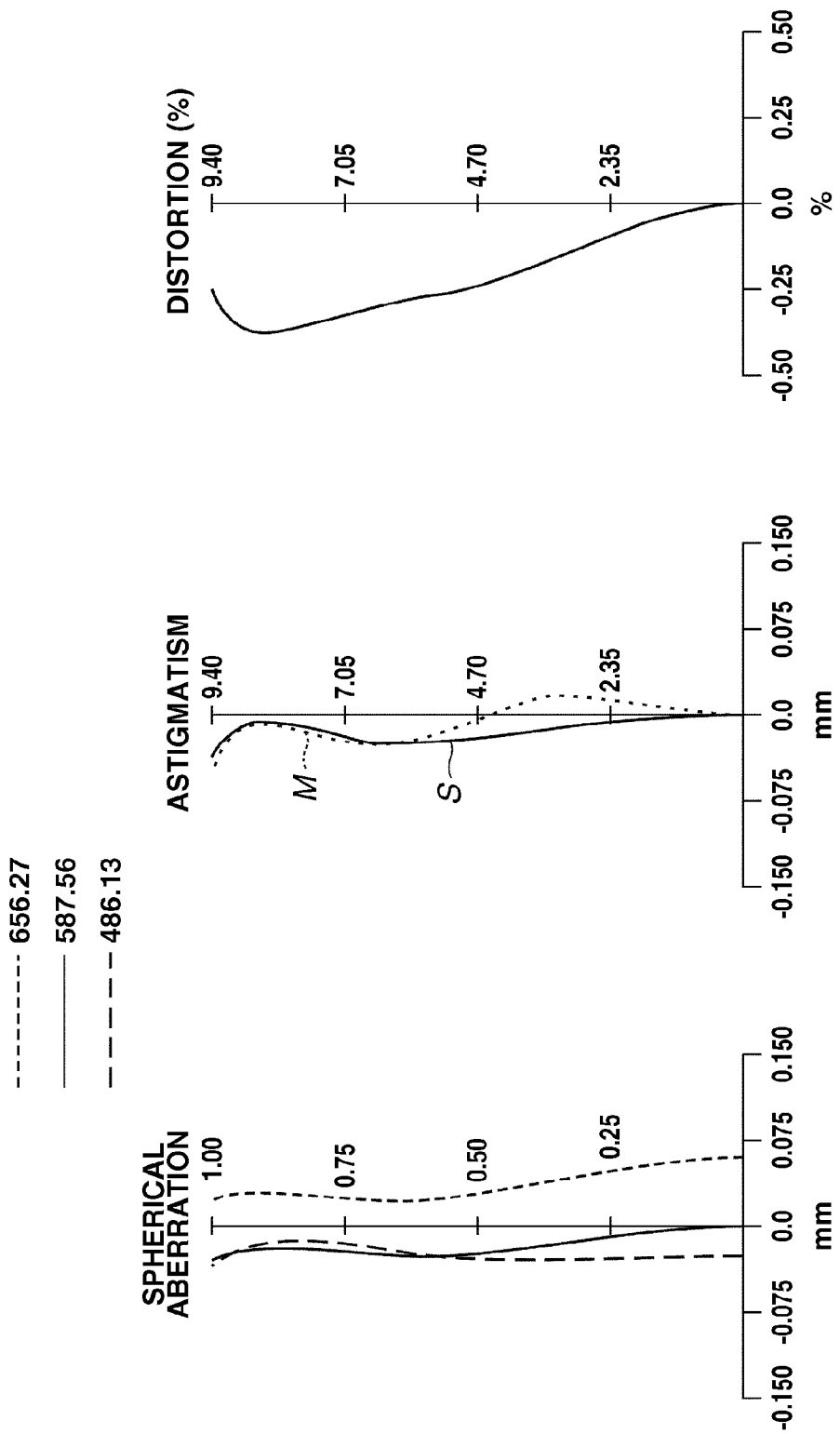
FIG. 8 illustrates longitudinal aberration graphs of the optical system according to a third embodiment of the present invention.

FIG. 8 illustrates longitudinal aberration graphs representing image forming performance according to the present embodiment.

A three-lens cemented lens SL2 is disposed in the second lens unit according to the present embodiment. The three-lens cemented lens SL2 is configured so that a lower-dispersion negative lens is interposed between higher-dispersion positive lenses. The three-lens cemented lens SL2 has a strong achromatic effect. In addition, the three-lens cemented lens SL2 can be configured to include, in order from the enlargement side, in this order from the enlargement side, a biconcave negative lens, a biconvex positive lens, and a negative meniscus lens having a concave surface facing the enlargement side.

Figure 9:
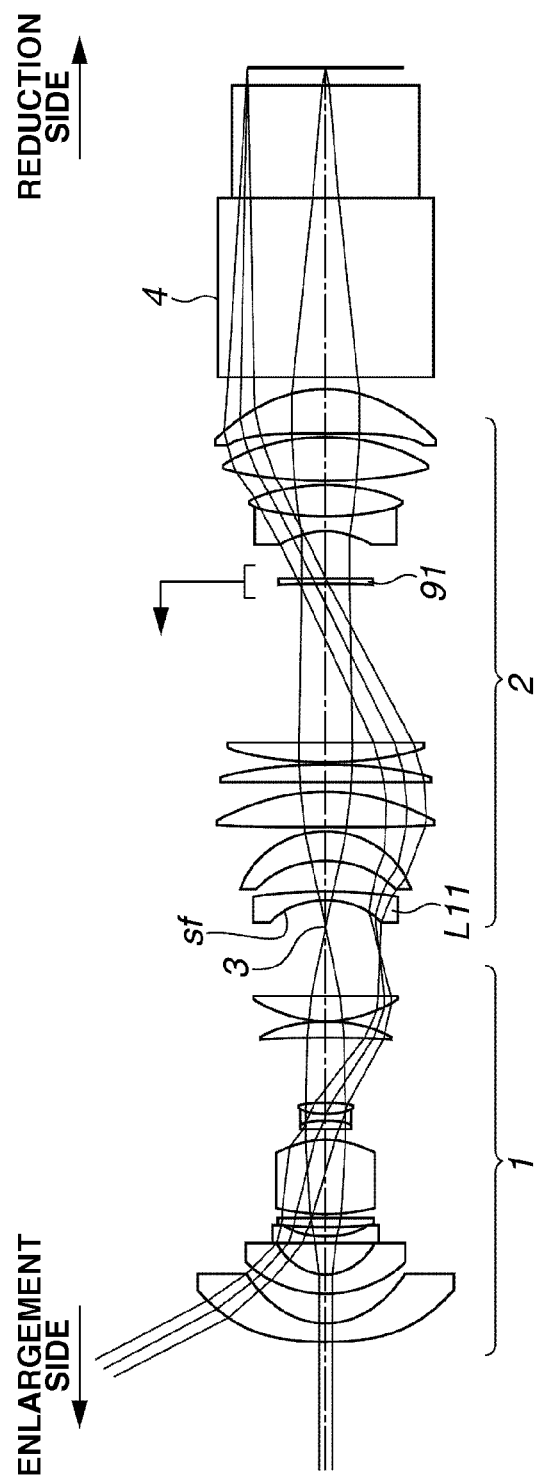
FIG. 9 is a cross-sectional view illustrating an optical system according to a fourth embodiment of the present invention.

FIG. 9 is a cross-sectional view illustrating a configuration of a wide-angle lens according to a fourth embodiment of the present invention. The fourth embodiment is different from the first embodiment in that focusing is performed by moving a sixth lens 91, which is the sixth lens from the enlargement side of the second lens unit 2, as a focus lens. The sixth lens 91 has a weak negative refractive power. During focusing from an infinitely distant point to a closest point, the sixth lens 91 is moved along the optical axis from the reduction side to the enlargement side. The focus lens, which is moved for performing focusing, may a single lens or a lens group (focus group) including a plurality of lenses.

A numerical example of the present embodiment is listed as Numerical Example 4. The letter "z" affixed to the numeric value of the surface distance denotes that the surface distance varies according to a change in object distance. In the last portion of the numerical example, listed is the numeric value of the surface distance according to a change in the object distance.

In the fourth embodiment, the lens corresponding to the negative lens L11 according to the first embodiment is a lens L11.

The wide-angle lens according to the fourth embodiment is also configured to satisfy the condition (A1) described in the first embodiment, and the lens disposed closest to the enlargement side of the second lens unit is configured as a negative lens. Therefore, it is possible to sufficiently correct distortion and to provide a miniaturized imaging lens.

In addition, the wide-angle lens according to the fourth embodiment is also configured to satisfy the desirable conditions described in the first embodiment, and thus, similar effects obtained in the conditions of the first embodiment can be also obtained.

Numerical Example 4

| |f| = 6.89 ω = 62.1° F/3.0 Image circle size φ26.2 | | | |
|---|---|---|---|---|
| | R | d | nd | νd |
| OBJ | ∞ | 667.00z | | |
| 1* | 83.035 | 3.33 | 1.768 | 49.2 |
| 2* | 13.997 | 4.90 | | |
| 3 | 18.992 | 3.23 | 1.799 | 29.8 |
| 4 | 8.723 | 5.55 | | |
| 5 | −237.318 | 1.01 | 1.784 | 26.2 |
| 6 | 14.347 | 1.41 | | |
| 7 | 41.907 | 1.70 | 1.772 | 49.5 |
| 8 | −726.137 | 0.50 | | |
| 9 | 28.677 | 12.60 | 1.772 | 49.5 |

-continued

| |f| = 6.89 ω = 62.1° F/3.0 Image circle size φ26.2 |||||
|---|---|---|---|---|
| 10 | −15.734 | 1.56 | | |
| 11 | 79.794 | 1.61 | 1.696 | 55.5 |
| 12 | −10.728 | 1.00 | 1.805 | 25.4 |
| 13 | 10.306 | 1.94 | 1.563 | 60.6 |
| 14 | −34.894 | 11.00 | | |
| 15 | −184.875 | 2.53 | 1.799 | 29.8 |
| 16 | −28.022 | 0.20 | | |
| 17 | 20.765 | 4.02 | 1.805 | 25.4 |
| 18 | 390.472 | 7.06 | | |
| 19 | ∞ | 9.19 | | |
| 20 | −12.985 | 1.50 | 1.805 | 25.4 |
| 21 | −99.493 | 5.10 | | |
| 22 | −17.029 | 5.07 | 1.805 | 25.4 |
| 23 | −15.357 | 0.50 | | |
| 24 | 457.856 | 6.09 | 1.772 | 49.5 |
| 25 | −35.370 | 1.52 | | |
| 26 | 944.629 | 2.95 | 1.805 | 25.4 |
| 27 | −75.396 | 0.50 | | |
| 28 | 62.959 | 3.27 | 1.805 | 25.4 |
| 29 | 1070.925 | 23.01 | | |
| 30 | ∞ | 3.66z | | |
| 31 | −87.951 | 1.00 | 1.487 | 70.2 |
| 32 | −162.164 | 7.82z | | |
| 33 | −12.686 | 2.36 | 1.799 | 29.8 |
| 34 | 39.274 | 5.46 | 1.772 | 49.5 |
| 35 | −31.754 | 0.50 | | |
| 36 | 67.885 | 7.51 | 1.496 | 81.5 |
| 37 | −32.069 | 0.50 | | |
| 38* | −625.000 | 7.32 | 1.677 | 54.8 |
| 39* | −22.773 | 2.00 | | |
| 40 | ∞ | 30.00 | 1.516 | 64.1 |
| 41 | ∞ | 19.00 | 1.805 | 25.4 |
| 42 IMG | ∞ | | | |

| Surface number | K | A | B | C | D | E | F |
|---|---|---|---|---|---|---|---|
| 1 | 0 | 6.893e−005 | −2.472e−007 | 5.381e−010 | −3.802e−013 | −4.379e−016 | 7.3562e−019 |
| 2 | 0 | 1.807e−006 | 3.830e−007 | −5.955e−009 | 3.466e−012 | 1.604e−013 | −5.7934e−016 |
| 38 | 0 | −1.890e−005 | −1.774e−008 | 2.406e−011 | −2.501e−014 | 7.008e−017 | 0 |
| 39 | 0 | 7.924e−006 | −2.017e−008 | 7.022e−011 | −1.408e−013 | 3.292e−016 | 0 |

| | Closest Point | Middle Point | Infinitely distant Point |
|---|---|---|---|
| OBJ | 667.00 | 400.00 | 1000.00 |
| d30 | 3.66 | 9.39 | 0.85 |
| d32 | 7.82 | 2.10 | 10.64 |

Paths of light rays are greatly changed according to a subject distance (object distance) in the case of a particularly-wide-angle lens as in the present embodiment, or according to a projection distance in the case of a projection lens. Therefore, there is a problem in that various aberrations are changed due to focusing. In order to perform focusing while suppressing a change in aberration if possible, a plurality of lenses needs to be moved during focusing, that is, floating needs to be performed. However, there is still a problem in that the change in aberration cannot be completely suppressed.

From the review of focusing of the lens where the in-lens conjugate point 3 is formed according to the present embodiment, it is found that the change in aberration is still large in the method for moving the entire first lens unit or the entire second lens unit. In this type of lens, the first lens unit 1 and the second lens unit 2 generate aberration in opposite directions to perform the aberration correction. Therefore, if the first lens unit 1 and the second lens unit 2 are independently moved, the change in aberration cannot be suppressed. On the other hand, since the first lens unit 1 is a retrofocus-type lens unit, the change in aberration may be suppressed to some degree by using the method for simultaneously moving a plurality of lens groups, which is called floating as described above. However, since distortion is changed, distortion cannot be sufficiently corrected, wherein the sufficient distortion correction is an object of the present embodiment.

Therefore, in the present embodiment, the change in aberration including distortion can be effectively suppressed by using the method for performing focusing by moving a portion of lenses of the second lens unit 2. In particular, in the second lens unit 2, it is desirable to move a lens having a weak refractive power in the vicinity of the light ray with the lowest image height. The reason is as follows. If the lens located at the position where the height of a light ray is low is allowed to be moved, the change in various off-axis aberrations due to the movement is suppressed. Therefore, the change in curvature of field or distortion can be suppressed to be almost zero. In other words, focusing is performed by moving a portion of lenses of the second lens unit 2, so that it is possible to greatly solve the problem of changes in aberration due to focusing changes.

Herein, when a focal length of the focus lens (entire optical system of the focus lens group in the case of a plurality of lenses) is denoted by $f_{fo}$, the following condition may be satisfied:

$$1.0 < |f_{fo}/f| < 200.0 \tag{7a}$$

More desirably, instead of the condition (7a), the following condition may be satisfied:

$$20.0 < |f_{fo}/f| < 100.0 \tag{7b}$$

In the conditions (7a) and (7b), if the numeric value is smaller than the lower limit value of the numeric range, the refractive power of the focus lens is strengthened, and thus it is difficult to suppress a change in aberration. On the other hand, if the numeric value is larger than the upper limit value of the numeric range, the refractive power is weakened, and the moving amount is increased during focusing, so that the size of the lens is greatly increased. In the present embodiment, the focal length $f_{fo}$ of the focus lens is −394.8 [mm], and $|f_{fo}/f|=57.3$.

Figure 10:
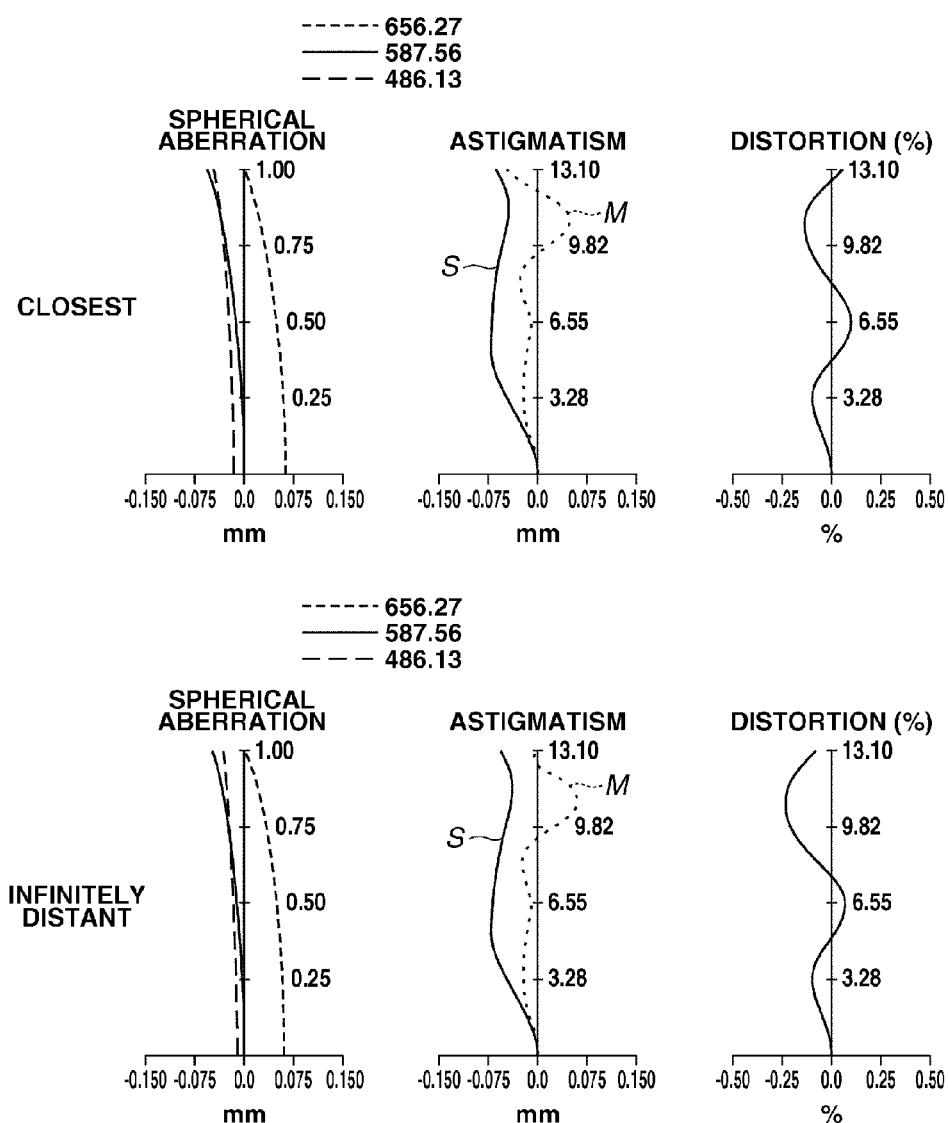
FIG. 10 illustrates longitudinal aberration graphs of the optical system according to the fourth embodiment of the present invention.

FIG. 10 illustrates longitudinal aberration graphs representing image forming performance according to the present embodiment. It can be understood that a change in various aberrations can be suppressed down to an infinitesimal level over the range of a closest point to an infinitely distant point. Although the example in which a single focus lens is moveable is described in the present embodiment, the embodiment is not limited to the example, but a focus lens group including a plurality of lenses may be moveable. In this case, if the focus lens described in the present embodiment is configured as a focus lens group, the same effect as that in the present embodiment can be obtained.

Figure 11:
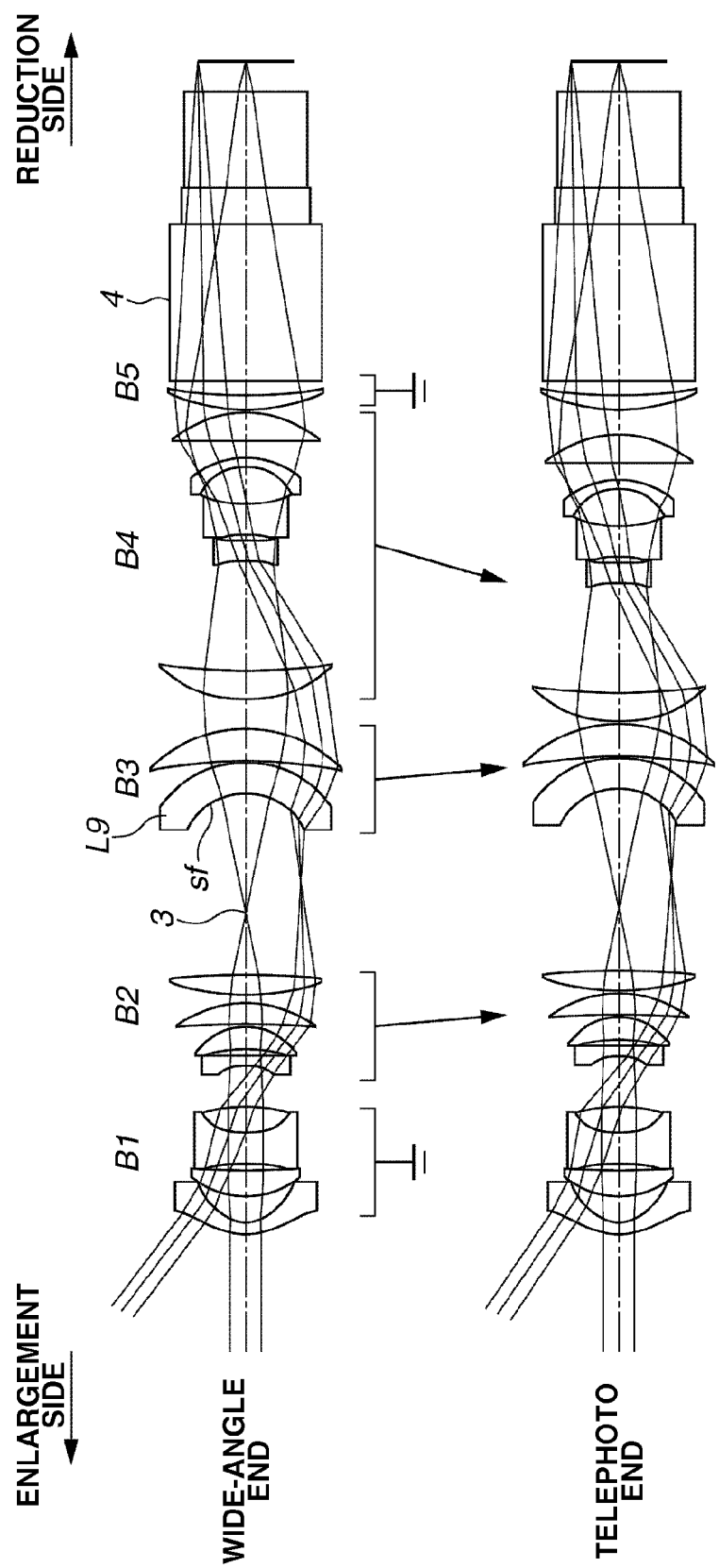
FIG. 11 is a cross-sectional view illustrating an optical system according to a fifth embodiment of the present invention.

FIG. 11 is a cross-sectional view illustrating a configuration of a wide-angle lens according to a fifth embodiment of the present invention. The fifth embodiment is different from the third embodiment in that a zoom lens is configured as a five-group configuration including five lens groups which are moved with the distance being changed during zooming. In the present embodiment, the first lens group B1 and the fifth lens group B5 are configured to be stationary during zooming, and the second lens group B2, the third lens group B3, and the fourth lens group B4 are configured to move during zooming.

A numerical example of the present embodiment is listed as Numerical Example 5. The letter "z" affixed to the numeric value of the surface distance denotes that the surface distance is changed in accordance with zooming. In the last portion of the numerical example, listed is the numeric value of the surface distance according to zooming.

In the fifth embodiment, the lens corresponding to the negative lens L11 according to the first embodiment is a lens L9.

The wide-angle lens according to the fifth embodiment is also configured to satisfy the condition (A1) described in the first embodiment, and the lens disposed closest to the enlargement side of the second lens unit (the third lens group B3) is configured as a negative lens. Therefore, it is possible to sufficiently correct distortion and to provide a miniaturized imaging lens.

In addition, the wide-angle lens according to the fifth embodiment is also configured to satisfy the desirable conditions described in the first embodiment, and thus, similar effects obtained in the conditions of the first embodiment can be also obtained.

Numerical Example 5

| | $|f|$ = 12.5 to 13.9 ω = 37 to 34° F/2.0 to 2.1 Image circle size φ18.8 | | | |
|---|---|---|---|---|
| | R | d | nd | vd |
| OBJ | ∞ | ∞ | | |
| 1* | 11.731 | 2.38 | 1.677 | 54.8 |
| 2* | 6.147 | 5.37 | | |
| 3 | 16.570 | 5.21 | 1.799 | 29.8 |
| 4 | 130.697 | 1.42 | | |
| 5 | −39.422 | 6.00 | 1.612 | 37.0 |
| 6 | 11.401 | 5.65 | 1.772 | 49.5 |
| 7 | −28.798 | 2.24z | | |
| 8 | ∞ | 1.47 | | |
| 9 | ∞ | 4.47 | | |
| 10 | −9.175 | 1.86 | 1.698 | 30.1 |
| 11 | −236.127 | 1.49 | | |
| 12 | −28.694 | 4.52 | 1.772 | 49.5 |
| 13 | −11.784 | 0.50 | | |
| 14 | −150.946 | 4.33 | 1.772 | 49.5 |
| 15 | −23.677 | 1.63z | | |
| 16 | 44.020 | 4.01 | 1.696 | 55.5 |
| 17 | −154.312 | 12.60 | | |
| 18 | ∞ | 15.55 | | |
| 19 | ∞ | 8.78 | | |
| 20 | −12.964 | 6.30 | 1.805 | 25.4 |
| 21 | −20.184 | 0.50 | | |
| 22 | −79.437 | 6.31 | 1.772 | 49.5 |
| 23 | −26.803 | 5.84z | | |
| 24 | 25.089 | 5.79 | 1.733 | 51.4 |
| 25 | 94.021 | 11.28 | | |
| 26 | ∞ | 11.15 | | |
| 27 | −17.106 | 4.02 | 1.805 | 25.4 |
| 28 | 39.895 | 1.07 | | |
| 29 | −51.285 | 6.30 | 1.799 | 29.8 |
| 30 | 23.544 | 7.78 | 1.487 | 70.2 |
| 31 | −10.252 | 1.60 | 1.761 | 26.5 |
| 32 | −16.281 | 3.53 | | |

-continued

|f| = 12.5 to 13.9 ω = 37 to 34° F/2.0 to 2.1
Image circle size φ18.8

| | | | | |
|---|---|---|---|---|
| 33 | −576.999 | 5.72 | 1.595 | 67.7 |
| 34 | −21.736 | 0.50z | | |
| 35 | 33.403 | 2.85 | 1.808 | 22.7 |
| 36 | 73.744 | 3.00 | | |
| 37 | ∞ | 31.74 | 1.516 | 64.1 |
| 38 | ∞ | 7.50 | 1.516 | 64.1 |
| 39 | ∞ | 19.50 | 1.805 | 25.4 |
| 40 | ∞ | | | |
| IMG | | | | |

| Surface number | K | A | B | C | D | E |
|---|---|---|---|---|---|---|
| 1 | −2.685e+000 | −2.336e−005 | −1.960e−007 | 3.509e−009 | −2.113e−011 | 4.005e−014 |
| 2 | −7.281e−001 | −1.890e−004 | −4.630e−010 | −1.110e−009 | 7.618e−011 | −9.632e−013 |

| | Wide-Angle End | Telephoto End |
|---|---|---|
| d7 | 2.24 | 4.27 |
| d15 | 1.63 | 0.50 |
| d23 | 5.84 | 0.50 |
| d34 | 0.50 | 4.93 |

In the lens type where the in-lens conjugate point 3 is formed according to the present embodiment, as described in the fourth embodiment, aberrations in the optical systems in front of and behind the in-lens conjugate point 3 are in a trade-off relation. Therefore, if only the one-side optical system is moved during zooming, aberration balance is changed, so that a change in aberration is increased. Accordingly, in the present embodiment, the second lens group B2 and the third lens group B3 are configured to be simultaneously moved, so that the aberration balance is maintained. In addition, the third lens group B3 is further moved, so that a change in position of an image plane caused by zooming of the third lens group B3 can be suppressed. Therefore, the zooming function is mainly performed by the second lens group B2 and the fourth lens group B4.

Figure 12:
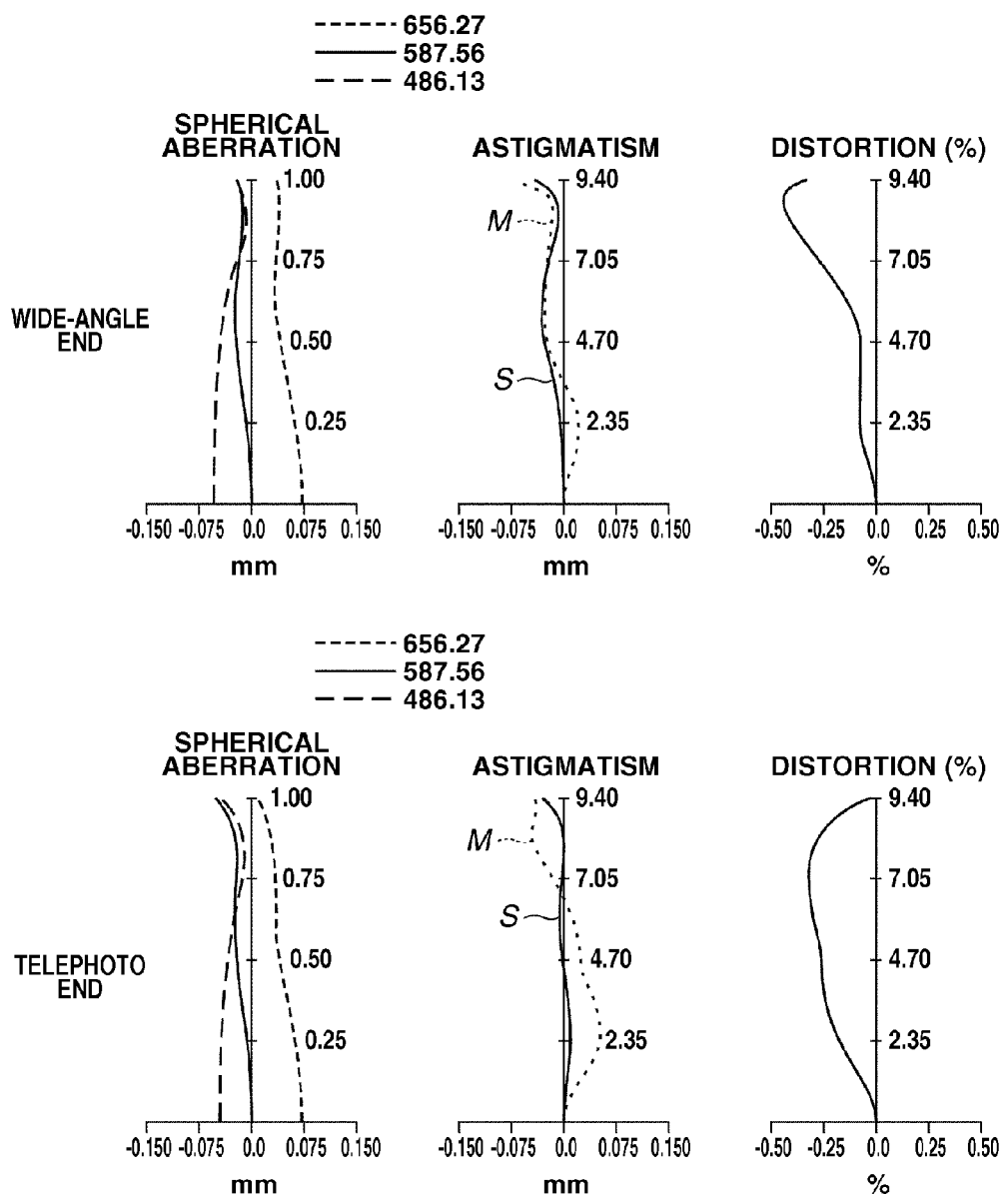
FIG. 12 illustrates longitudinal aberration graphs of the optical system according to the fifth embodiment of the present invention.

FIG. 12 illustrates longitudinal aberration graphs representing image forming performance according to the present embodiment. It is understood that basic image performance is maintained even when zooming is performed.

Finally, the values of numeric conditions in all the embodiments described hereinbefore are listed. With respect to the condition (6a), since a degree of wide angle is small, numerical values in the third and fifth embodiments are not listed.

TABLE 1

| | Numerical Example 1 | Numerical Example 2 | Numerical Example 3 |
|---|---|---|---|
| Focal length |f| of entire optical system | 6.9 | 10 | 12.4 |
| Focal length fF of first lens unit | 6.09 | 4.43 | 15.20 |
| Focal length fR of second lens unit | 46.3 | 16.1 | 217.5 |
| Focal length f1 of first lens of second lens unit | −15.1 | −19.2 | −116 |
| Focal length fR1 of first group of second lens unit | 18.5 | 13.5 | 25.7 |

TABLE 1-continued

| | Numerical Example 1 | Numerical Example 2 | Numerical Example 3 |
|---|---|---|---|
| Radius of curvature r of first surface of second lens Unit | −11.7 | −13.4 | −13.3 |
| Refractive index n of first lens of Second Lens Unit | 1.834 | 1.738 | 1.773 |
| Condition (2a) f1/|f| | −2.190 | −1.916 | −9.357 |
| Condition (3a) f1/fF | −2.480 | −4.329 | −7.634 |
| Condition (1a) f1/fR | −0.327 | −1.191 | −0.533 |
| Condition (4a) r/|f| | −1.700 | −1.343 | −1.072 |
| Condition (5a) r/|fR1(n − 1) | −0.759 | −1.351 | −0.669 |
| Condition (6a) f1/f2 | −0.174 | −0.247 | |
| Condition (7a) |f$_{fe}$/f| | | | |
| Condition (A1) fF/fR | 0.13 | 0.28 | 0.070 |

| | Numerical Example 4 | Numerical Example 5 | |
|---|---|---|---|
| | | Wide-angle end | Telephoto end |
| Focal length |f| of entire optical system | 6.89 | 12.5 | 13.9 |
| Focal length fF of first lens unit | 5.28 | 15.63 | 16.5 |
| Focal length fR of second lens unit | 113.4 | 117.5 | 112.6 |
| Focal length f1 of first lens of second lens unit | −18.5 | −73.3 | −73.3 |
| Focal length fR1 of first group of second lens unit | 19.0 | 24.7 | 23.8 |

TABLE 1-continued

| | | | |
|---|---|---|---|
| Radius of curvature r of first surface of second lens Unit | −13.0 | −13.0 | −13.0 |
| Refractive index n of first lens of Second Lens Unit | 1.805 | 1.805 | 1.805 |
| Condition (2a) f1/\|f\| | −2.692 | −5.861 | −5.271 |
| Condition (3a) f1/fF | −3.509 | −4.689 | −4.440 |
| Condition (1a) f1/fR | −0.164 | −0.623 | −0.650 |
| Condition (4a) r/\|f\| | −1.885 | −1.037 | −0.933 |
| Condition (5a) r/{fR1·(n − 1)} | −0.849 | −0.652 | −0.676 |
| Condition (6a) f1/f2 | −0.227 | | |
| Condition (7a) \|$f_{fo}$/f\| | 57.3 | | |
| Condition (A1) fF/fR | 0.047 | 0.13 | 0.15 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-169755 filed Jul. 31, 2012, which is hereby incorporated by reference herein in its entirety.

What is claimed is:

1. An imaging optical system comprising:
   a first optical unit having positive refractive power making an image at an image plane at an enlargement-side of the imaging optical system and an intermediate image at an intermediate image position in the imaging optical system conjugate to each other; and
   a second optical unit having positive refractive power making the intermediate image and an image at an image plane at a reduction-side of the imaging optical system conjugate to each other,
   wherein, when a focal length of the first optical unit is denoted by fF and a focal length of the second optical unit is denoted by fR, the following condition is satisfied:

$0.0 < fF/fR < 0.8$, and wherein the second optical unit comprises a negative lens disposed on the optical axis closest to the enlargement side.

2. The imaging optical system according to claim 1, wherein, when a focal length of the negative lens is denoted by f1, the following condition is satisfied:

$-5.00 < f1/fR < -0.05$.

3. The imaging optical system according to claim 1, wherein, when a focal length of the negative lens is denoted by f1 and a focal length of the entire optical system including the first and second optical units is denoted by \|f\|, the following condition is satisfied:

$-20.0 < f1/|f| < 0.0$.

4. The imaging optical system according to claim 1, wherein, when a focal length of the negative lens is denoted by f1, the following condition is satisfied:

$-12.0 < f1/fF < 0.0$.

5. The imaging optical system according to claim 1, wherein an enlargement-side surface of the negative lens has a shape convex toward the reduction side, and
   wherein, where a radius of curvature of the enlargement-side surface of the negative lens is denoted by r and a focal length of the entire optical system including the first optical unit and the second optical unit is denoted by \|f\|, the following condition is satisfied:

$-3.0 < r/|f| < -0.1$

6. The imaging optical system according to claim 1, wherein the enlargement-side surface of the negative lens has a shape convex toward the reduction side, and
   wherein, when a radius of curvature of the enlargement-side surface of the negative lens is denoted by r, a refractive index of the negative lens is denoted by n, and a focal length of a lens or a lens group disposed at the enlargement side with respect to the largest surface distance in the second optical unit is denoted by fR1, the following condition is satisfied:

$-1.5 < r/\{fR1·(n-1)\} < -0.5$.

7. The imaging optical system according to claim 1, operable to perform focusing by moving a portion of the second optical unit as a focus group.

8. The imaging optical system according to claim 7, wherein, when a focal length of the focus group is denoted by $f_{fo}$ and a focal length of the entire optical system including the first optical unit and the second optical unit is denoted by \|f\|, the following condition is satisfied:

$1 < |f_{fo}/f| < 200$.

9. The imaging optical system according to claim 7, wherein a lens in the focus group has the smallest diameter of any of the lenses in the second optical unit.

10. The imaging optical system according to claim 7, wherein the focus group is arranged so that it is moved from the reduction side to the enlargement side during focusing from infinity to a closest focusing distance.

11. The imaging optical system according to claim 1, arranged so that for zooming, at least one lens is moved in each of the first optical unit and the second optical unit.

12. The imaging optical system according to claim 1, wherein the first and second optical units are arranged such that converging light rays are incident on the negative lens.

13. The imaging optical system according to claim 1, further comprising a positive lens disposed at the reduction side of the negative lens,
   wherein the positive lens is disposed at a position adjacent to the negative lens.

14. The imaging optical system according to claim 13, wherein the positive lens is a meniscus lens having a shape convex toward the reduction side.

15. The imaging optical system according to claim 13, wherein, when a focal length of the negative lens is denoted by f1 and a focal length of the positive lens is denoted by f2, the following condition is satisfied:

$-1.00 < f1/f2 < -0.05$.

16. The imaging optical system according to claim 1, wherein the imaging optical system is a projection optical system configured to project an image by projecting an image formed from light from a light modulation element at the reduction side imaging plane onto a projection receiving surface at the enlargement side imaging plane.

17. The imaging optical system according to claim 1, wherein the imaging optical system is configured to form an image from light received from an object at the enlargement side imaging plane on an image sensor at the reduction side imaging plane.

18. A projection-type image display apparatus comprising:
a light modulation element; and
a projection optical system configured to project an image by projecting light from the light modulation element onto a projection receiving surface,
the projection optical system comprising:
a first optical unit having positive refractive power making an image at an image plane at an enlargement-side of the imaging optical system and an intermediate image at an intermediate image position in the imaging optical system conjugate to each other; and
a second optical unit having positive refractive power making the intermediate image and an image at an image plane at a reduction-side of the imaging optical system conjugate to each other,
wherein, when a focal length of the first optical unit is denoted by fF and a focal length of the second optical unit is denoted by fR, the following condition is satisfied:

$0.0 < fF/fR < 0.8$, and wherein the second optical unit comprises a negative lens disposed on the optical axis closest to the enlargement side.

19. The projection-type image display apparatus according to claim 18, further comprising a moving unit configured to move the imaging optical system in a direction giving a component of movement of the imaging optical system perpendicular to its optical axis, and
arranged so that upon moving the imaging optical system the projected image is moved in a direction opposite to the moving direction of the imaging optical system.

20. An image pickup apparatus comprising:
an image sensor; and
an imaging optical system configured to form an image of light from an object on the image sensor,
the imaging optical system comprising:
a first optical unit having positive refractive power making an image at an image plane at an enlargement-side of the imaging optical system and an intermediate image at an intermediate image position in the imaging optical system conjugate to each other; and
a second optical unit having positive refractive power making the intermediate image and an image at an image plane at a reduction-side of the imaging optical system conjugate to each other,
wherein, when a focal length of the first optical unit is denoted by fF and a focal length of the second optical unit is denoted by fR, the following condition is satisfied:

$0.0 < fF/fR < 0.8$, and wherein the second optical unit comprises a negative lens disposed on the optical axis closest to the enlargement side.

\* \* \* \* \*